March 12, 1963 R. N. HARRIS ETAL 3,080,809
PICKLE INJECTING APPARATUS
Filed March 8, 1961 2 Sheets-Sheet 1
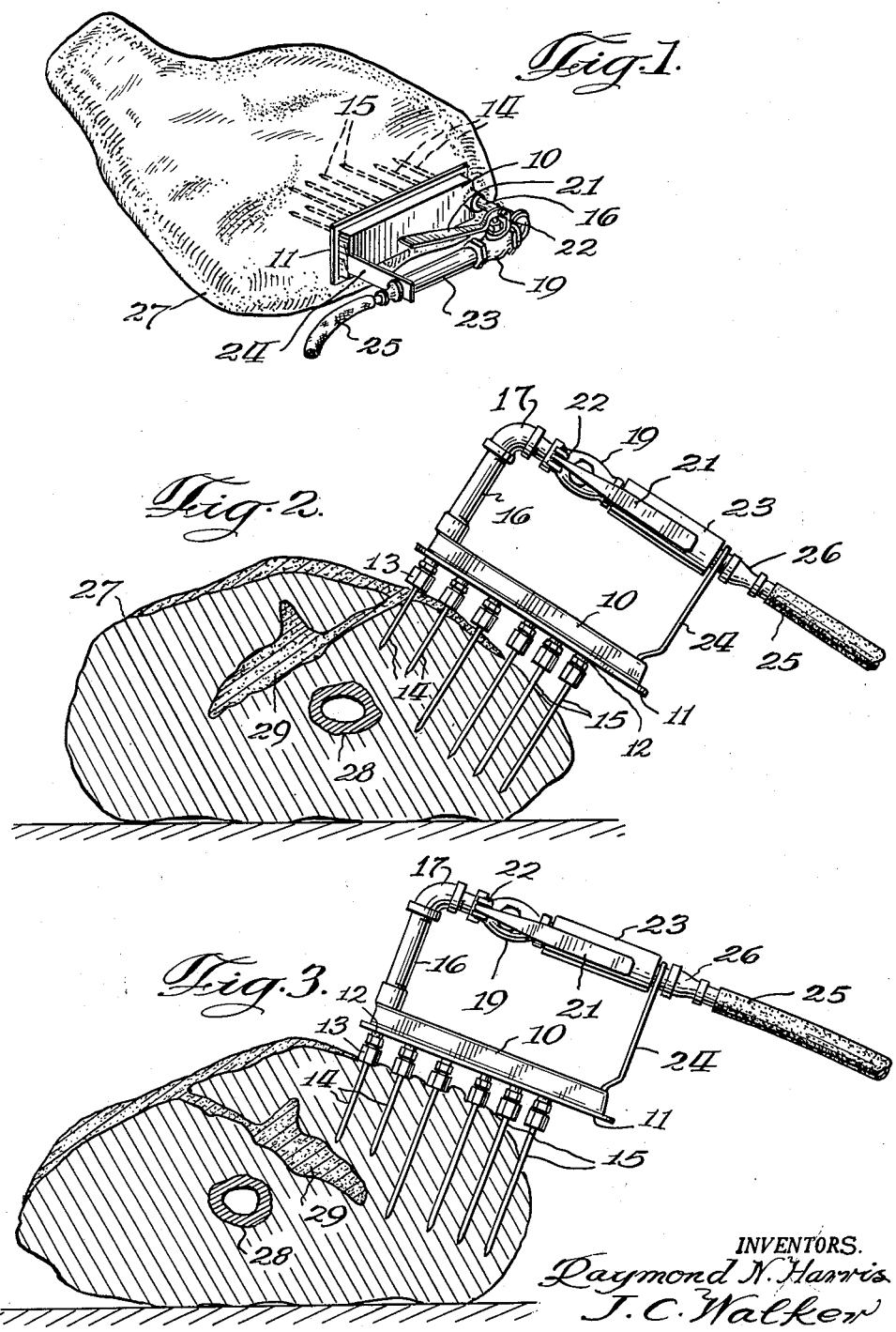

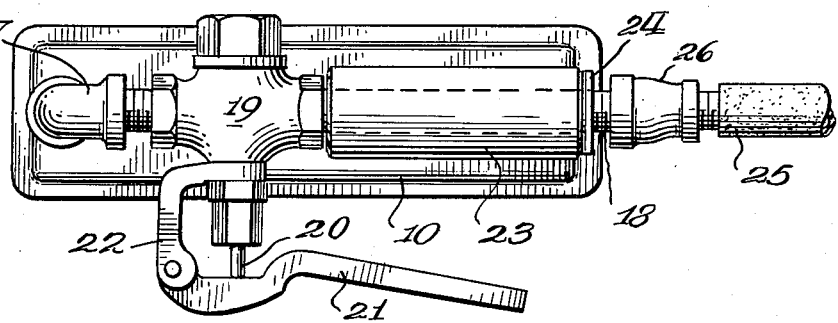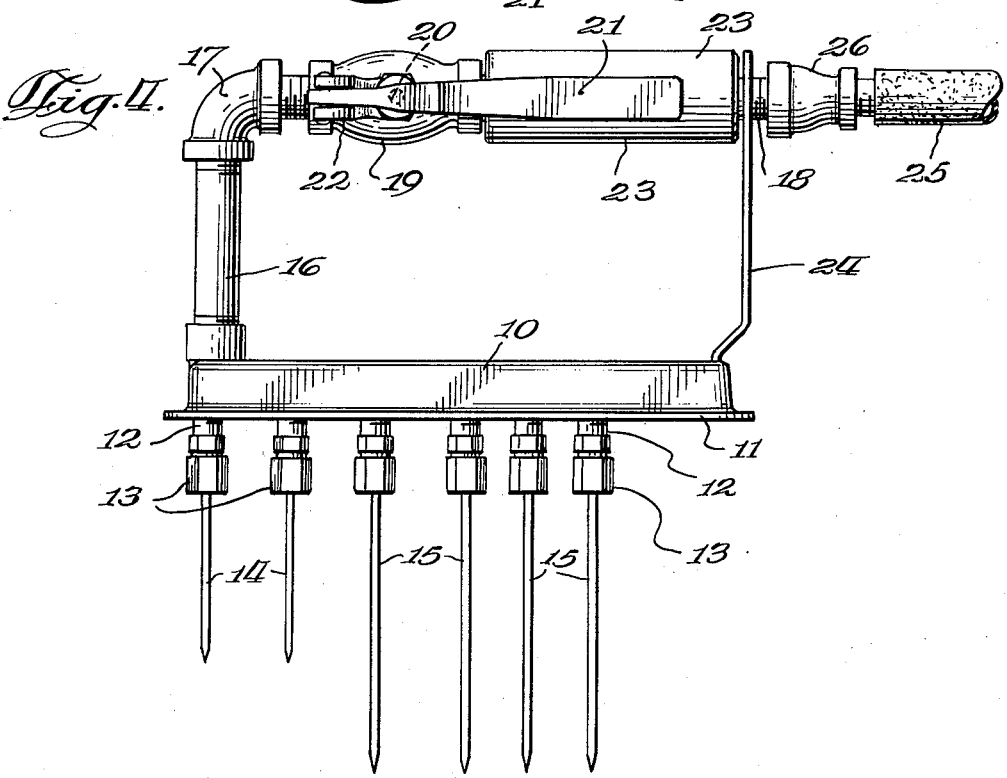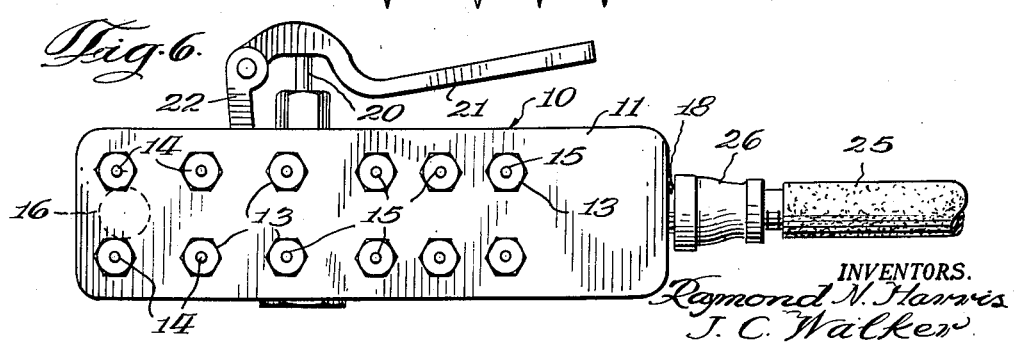

3,080,809
PICKLE INJECTING APPARATUS
Raymond N. Harris, Omaha, Nebr., and J. C. Walker, Huron, S. Dak., assignors to Armour and Company, Chicago, Ill., a corporation of Delaware
Filed Mar. 8, 1961, Ser. No. 94,283
5 Claims. (Cl. 99—257)

This invention relates to pickle injecting apparatus, and more particularly to apparatus for injecting pickle solution into "bone-in" hams.

In the curing of hams containing the aitch bone, pickle solution is pumped to an injection device equipped with hollow needles, and the device is moved to bring the needles into the ham. The bone in the ham limits the extent of injection of the solution. Further, the kernel fat in the foregoing operation receives an excessive amount of pickle. While it is common also to pump pickle solution through arteries in the ham during the curing operation, it is found that many hams contain ruptured arteries, so that there remain definite under-cured areas. The ruptured arteries are caused through mishandling of the livestock while alive, and there is no way that the ruptured arteries in the ham can be detected. If it were possible through the manipulation of a pickle injecting device to inject the pickle solution thoroughly through the ham, the above difficulties would be overcome.

A primary object, therefore, of the present invention is to provide apparatus which may be applied to bone-containing hams so as to give a uniform distribution of pickle throughout the ham and thus eliminate under-cured areas. A further object is to provide a pickle injecting device which is portable and may be operated by hand for the injection of cure solution into hams without applying excessive pickle into the kernel fat and without limiting the discharge of the solution to the depth of the bone at the area of application. A still further object is to provide a portable, hand-operated pickle injecting device which may be applied to hams for deep penetration while also avoiding the injection of excessive solution into the kernel fat. Yet another object is to provide a hand-operated injecting device having at one end relatively short hollow needles and along the other area relatively long needles, whereby deep penetration of the ham can be obtained irrespective of the presence of the bone, while at the same time permitting a rotary movement of the device during the application of the solution for thorough and uniform curing. Other specific objects and advantages will appear as the specification proceeds.

The invention is shown, in an illustrative embodiment, by the accompanying drawing, in which—

FIG. 1 is a perspective view of the device embodying our invention being applied to the butt of a ham; FIG. 2, a side view in elevation of said device with the needles thereof being applied to the shank side of the ham; FIG. 3, a view similar to FIG. 2 but showing the needles of the injecting device being applied to the cushion side of the ham; FIG. 4, an enlarged side view in elevation of the injecting device; FIG. 5, a top plan view; and FIG. 6, a bottom plan view.

In the illustration given, 10 designates a casing providing a manifold having a bottom side or plate 11. Secured to the plate 11 are threaded conduits 12 provided with needle adapters or retainers 13, into which extend hollow needles. At one end of the side or plate 11 are mounted relatively short hollow needles 14, while the remaining area of the plate 11 is provided with relatively long needles 15. A pickle solution supply conduit 16 communicates with the forward end of the manifold 10 so as to supply pickle solution to the manifold chamber within. The conduit 16 is provided at its top with an elbow 17 and with a rearwardly-extending conduit 18 in which is mounted a valve 19. The valve 19 is equipped with a stem 20 operated by the lever arm 21 pivotally connected to the bracket 22. An insulating sleeve 23, formed of rubber or other suitable material, extends rearwardly of the valve 19 so as to provide a handle by which the device can be manipulated during the injection of the solution. A supporting strap 24 welded to the casing 10 extends upwardly and is apertured to receive the rearwardly-extending conduit portion 18. A flexible hose 25 leads from a pump (not shown) and which in turn communicates with a pickle supply tank, and the forward end of the hose 25 is connected to the conduit 18 through the fitting 26.

With the construction shown, the operator can grasp the handle 23 with one hand and manipulate the injecting device to the desired positions illustrated in FIGS. 1, 2 and 3. During such manipulating operations, the valve-operating lever 21, which extends laterally of the device, may be left unoperated and finally may be manipulated by the free fingers of the operator after the needles have been moved to their desired penetrating positions. Thus, the operator can use one hand for supporting or turning the ham, while with the other he can manipulate the injecting device, opening the valve after the needles have been moved to their desired positions.

The needles 14 are preferably spaced more widely apart than the long needles at the other end of the manifold so as to further aid in obtaining uniform distribution of the cure within the ham. Further, the needles are preferably arranged in two rows, as indicated best in FIG. 6. As a specific example, the needles 14 forming the first two rows may have a length of approximately 2 13/16" and may be spaced apart longitudinally of the side 11 by approximately one inch. The needles 15 may be approximately 4½" long and may be spaced apart ¾". In the specific example, the first long row of needles 15 is spaced from the remaining rows of long needles 15 by approximately one inch. It will be understood that the dimensions may vary widely depending upon the type of hams being cured, and the needle spacings and lengths may also be modified for the treating of different types and sizes of hams.

In the illustration given in FIGS. 1, 2 and 3, the ham is indicated by the numeral 27. The numeral 28 designates the aitch bone, and 29 designates the kernel fat.

*Operation*

In the operation of the apparatus, pickle solution is pumped through a conduit 18. The device may then be moved, preferably to the shank side of a ham, as shown in FIG. 2, and the valve 19 opened to allow the solution to extend through the conduit portion 16 and into the manifold 10 and thence out through the needles into the body of the ham. In this operation, the penetration of the long needles 15 is not limited because the short needles are not stopped by the bone 28 of the ham. Further, the short needles 14 do not discharge the solution into the kernel fat portion 29.

The injection device may then be applied to the cushion side of the ham, as shown in FIG. 3, and it will be noted in this operation that the short needles 14 do not reach and engage the kernel fat 29, while the long needles 15 may swing downwardly in a partially rotary direction so as to carry the curing solution deeply within the ham for uniform distribution. In the rotary movement described in connection with FIGS. 2 and 3, the relatively short needles 14, because of their relatively short penetration, permit the turning of the device for the thorough distribution of the solution through the long needles 15. In the final step, the device may be applied to the butt of the ham, as illustrated in FIG. 1.

Even though the ham contains ruptured arteries so that there are under-cured spots in the ham, it is found that the foregoing operations with the injection device eliminate the under-cured areas. Further, excessive pickle is not injected directly into the kernel fat, and the bone 28 of the ham 27 does not limit the deep penetration which is accomplished by the movements described in FIGS. 2 and 3.

Referring more particularly to FIGS. 2 and 3, it will be observed that the ham has rounded end portions permitting the swinging of the injection device downwardly, and the short needles 14 cooperate in this swinging movement so that, after pickle solution is first injected by the needles 14 and the device is swung rearwardly and downwardly, the short needles do not obstruct the rotation and, in fact, are partially withdrawn, so that there is a deep and thorough penetration of the ham to effect uniform curing.

While, in the foregoing specification, we have set forth a specific structure in considerable detail for the purpose of illustrating one embodiment of the invention, it will be understood that such details may be varied widely by those skilled in the art without departing from the spirit of our invention.

We claim:

1. In apparatus for injecting pickle solution into hams, a casing manifold for receiving said solution, a plurality of hollow injection needles extending downwardly from the lower side of said manifold and communicating with the interior of said manifold, said needles being relatively short in length adjacent one end of said manifold and relatively long in length adjacent the other bottom portion of said manifold, means for raising and lowering said manifold, a conduit communicating with said manifold for supplying solution thereto, and valve means carried by said conduit for controlling the flow through said conduit.

2. The apparatus of claim 1 in which said conduit communicates with said manifold at the end adjacent said short needles and in which said short needles are spaced more widely apart than said relatively long needles.

3. A portable device for injecting pickle solution into hams containing bones, comprising a casing manifold adapted to receive said solution, hollow needles projecting downwardly from the bottom side of the manifold and communicating with the interior of the manifold, a conduit communicating with one end of said manifold and extending over said manifold in spaced relation thereto to provide a handle, a valve in said conduit portion above said manifold and a lever carried by said conduit for operating said valve and extending laterally of said handle portion for engagement with the fingers of the operator, said needles adjacent the inlet end of said manifold being relatively short and the remaining needles of said manifold being relatively long.

4. A portable injection device for injecting pickle solution into bone-containing hams, comprising a manifold casing adapted to receive solution, hollow needles extending from said manifold and communicating with the interior thereof, the needles adjacent one end of said manifold being shorter than the remaining needles communicating with said manifold, a conduit for supplying pickle solution to siad manifold extending over said manifold in spaced relation thereto, and a valve carried by said conduit for controlling flow therethrough.

5. A portable injecting device for injecting pickle solution into hams, comprising a conduit equipped with a valve and provided with an insulating handle sleeve, a laterally-extending lever carried by said conduit adjacent said handle for operating said valve, a manifold casing, a second conduit establishing communication between said valve and said manifold, and a plurality of hollow needles depending from the bottom side of said manifold and communicating with the interior of said manifold, said needles, adjacent one end of said manifold, being relatively short, and the remaining needles communicating with said manifold being relatively long.

No references cited.